United States Patent

Stenert

Patent Number: 5,116,146
Date of Patent: May 26, 1992

[54] CAGE FOR A LARGE ROLLER BEARING

[75] Inventor: Alois Stenert, Lippstadt, Fed. Rep. of Germany

[73] Assignee: Hoesch AG, Dortmund, Fed. Rep. of Germany

[21] Appl. No.: 698,835

[22] Filed: May 10, 1991

[30] Foreign Application Priority Data

May 12, 1990 [DE] Fed. Rep. of Germany ....... 4015303

[51] Int. Cl.$^5$ ................. F16C 33/51; F16C 33/56
[52] U.S. Cl. ................... 384/578; 384/572; 384/576
[58] Field of Search .......... 384/51, 572, 573, 575–580, 384/623

[56] References Cited

U.S. PATENT DOCUMENTS

| 2,946,633 | 7/1960 | Göthberg | 384/576 |
| 3,694,043 | 9/1972 | Tellson | 384/578 |
| 3,801,172 | 4/1974 | Veglia | 384/578 |
| 4,413,866 | 11/1983 | Geisey | 384/572 |
| 4,598,957 | 7/1986 | Shibayama | 384/51 |

FOREIGN PATENT DOCUMENTS

| 1007570 | 5/1957 | Fed. Rep. of Germany | 384/578 |
| 1801597 | 5/1970 | Fed. Rep. of Germany | 384/578 |
| 3520814 | 12/1986 | Fed. Rep. of Germany | 384/576 |

Primary Examiner—Thomas R. Hannon
Attorney, Agent, or Firm—Max Fogiel

[57] ABSTRACT

A cage for a large roller bearing that loosely surrounds and mechanically secures the rollers. It comprises, first, a strip (2) of metal with lateral and intermediate webs (4 & 5) that leave recesses (6) and, second, plastic windows (6) that fit into the associated recesses. The windows have collars (8) that rest against the surface of the strip. The object of the invention is to improve the cage to the extent that it can be securely positioned in the bearing system without slides. Each window (6) accordingly has a securing rim (10) on its collar (8) that overlaps the lateral web (4).

7 Claims, 2 Drawing Sheets

CAGE FOR A LARGE ROLLER BEARING

BACKGROUND OF THE INVENTION

Cages of this type position the rollers against the race and hold them there in relation to one another and to the bearing system. They also prevent the individual rollers from coming into contact.

German Patent 1 007 570 discloses making such cages in the form of binary windowed cages. Such cages consist of a strip of metal with recesses, each with a plastic window in it. The windows have a collar that rests against the metal strip. One drawback to such cages is that they require an additional guide to position the strip in the race system when they are used in large roller bearings in axial races. Metal slides on the strip are usually employed for this purpose, especially in large roller bearings.

SUMMARY OF THE INVENTION

The object of the invention is to improve a cage for a large roller bearing to the extent that it can be securely positioned in the bearing system without slides.

One particular advantage of the invention is that the large roller-bearing cage can be manufactured simple in structure and with few components. The cage, however, will still be securely positioned in the bearing's race system. Another advantage over the design with the slides is that the contact surfaces on the rings that the cage rests against no longer need to be hardened. Furthermore, when the cage becomes worn, the plastic windows can be replaced and the expensive metal strip can be used again. The plastic cage can be inserted into the strip at any position that makes sense.

BRIEF DESCRIPTION OF THE DRAWINGS

One embodiment of the invention will now be described with reference to the drawing, wherein.

DESCRIPTION OF THE PREFERRED EMBODIMENTS

Figure 1:
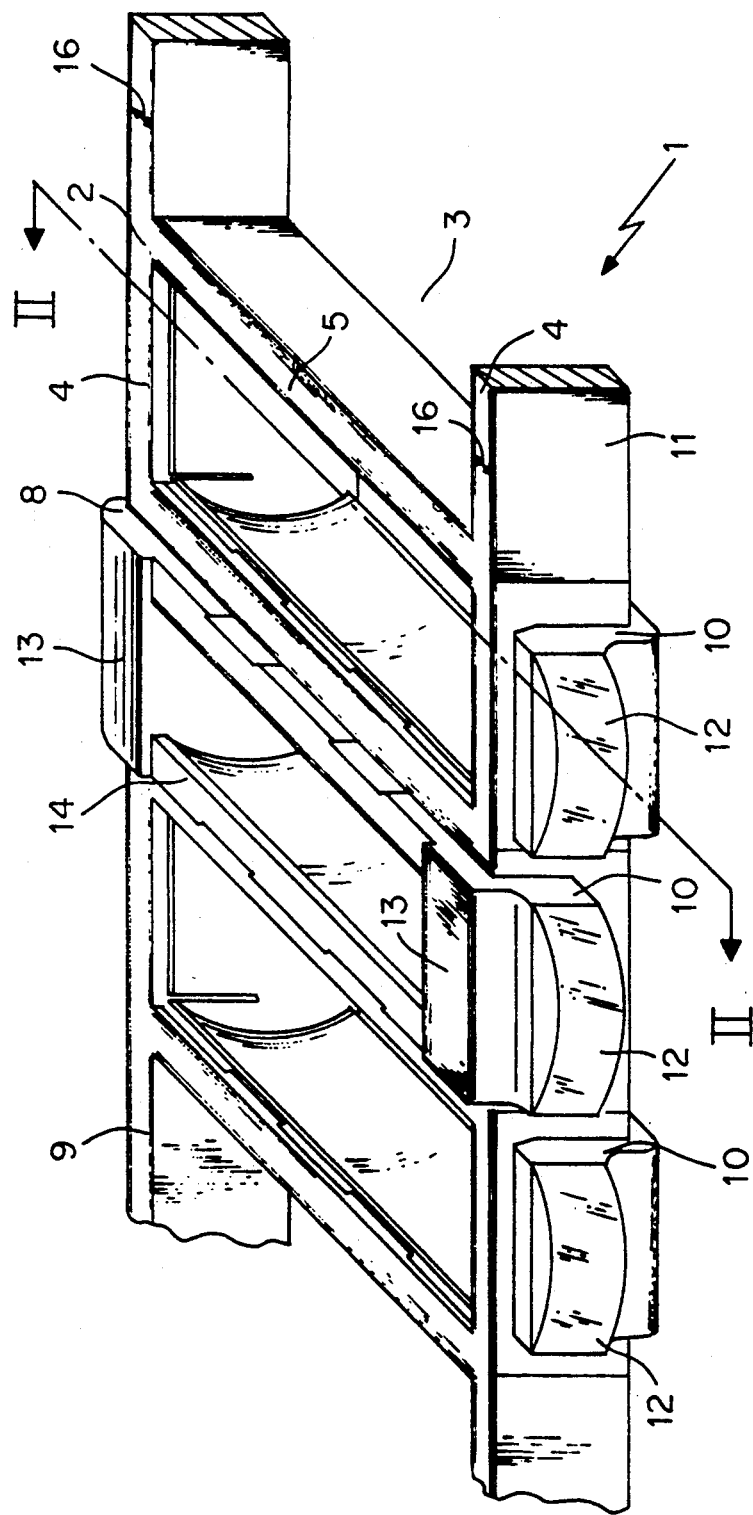
FIG. 1 illustrates part of the cage in accordance with the invention.
Figure 2:
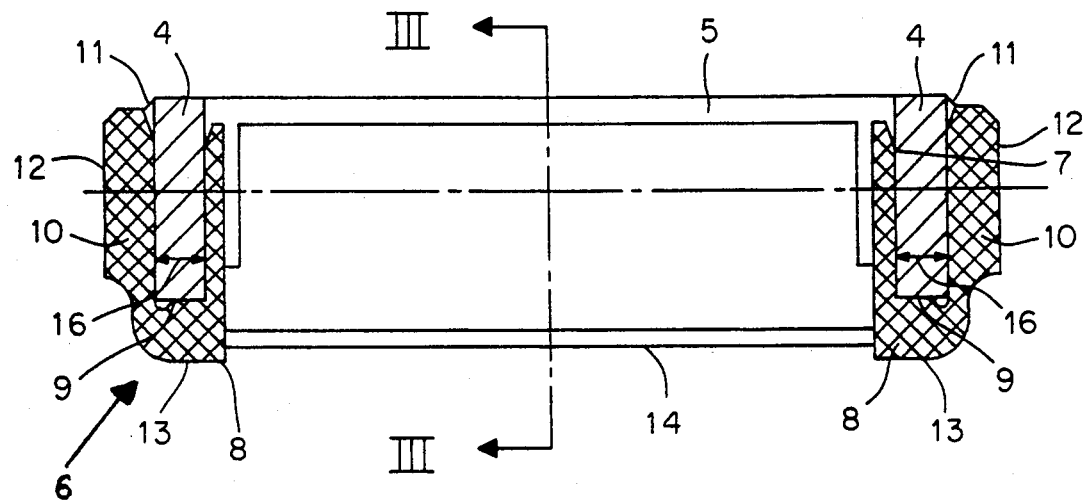
FIG. 2 is a section along the line II—II through the cage illustrated in FIG. 1.
Figure 3:
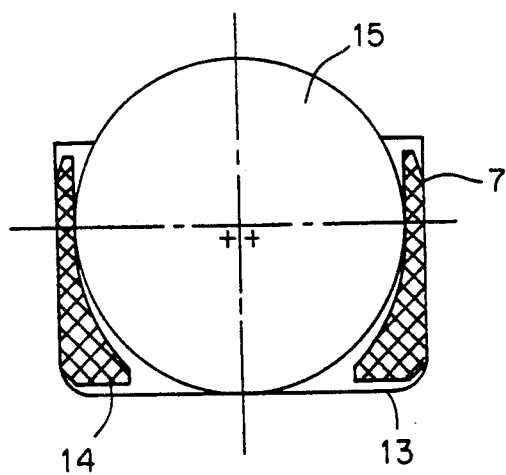
FIG. 3 is a section along the line III—III through the plastic window in FIG. 2.

A cage 1 for a large roller bearing comprises a strip 2 of metal with recesses 3. The recesses are rectangular and leave lateral webs 4 and intermediate webs 5. Plastic windows 6 are inserted in recesses 3. The windows have partitions 7 that engage all sides of the recesses. Adjacent to partitions 7 are collars 8 that in the illustrated embodiment overlap lateral webs 4 and rest against the surface 9 of metal strip 2. Collars can also be mounted on windows 6 such as to overlap some or all of intermediate webs 5. Positioned on windows 6 next to the collars 8 that overlap lateral webs 4 are securing rims 10 that rest against the outer surfaces 11 of lateral webs 4. To ensure that the plastic windows can be employed with cages of different diameter, the surfaces 12 on the outside of securing rims 10 are convex. The collars 8 on lateral webs 4 have a positioning surface 13 that overlaps the central surface 14. This prevents the cage from resting directly against the race, which rollers 15 roll over. The plastic windows in the illustrated embodiment are inserted alternately into the recesses in the metal strip from opposite sides. Depending on the situation and on the purpose of the bearing, however, it is also possible for all the windows to be inserted from one side or in any configuration—two from below alternating with two from above for example. The cage need not be positioned only by the windows' positioning surfaces 13 and surfaces 12. A conventional roller positioning mechanism can be employed additionally or exclusively. It will be evident from FIG. 3 that window 6 is thicker toward the inside and matches the roller 15 that is to be secured halfway up its contour. The thickness 16 of the lateral web is uniform, making the outer and inner surface of an axial cage polygonal. The cage can in a known way be made of one or more components. When it is in more than one part, separating the intermediate webs is recommended. Plastic windows 6 are designed to be inserted resilient into the recesses 3 in metal strip 2. Rounding off the edges of the windows will preserve the requisite level of lubrication as the rollers slide and will maintain the film of lubricant intact. Windows 6 are symmetrical with respect to planes II—II and III—III. The windows can all be manufactured with one basic tool if the rollers have the same outside dimensions. This is possible for example when long rollers alternate with double rollers.

I claim:

1. A cage for a large roller bearing surrounding loosely and securing in place rollers of said bearing, comprising: a strip of metal with lateral webs and intermediate webs forming recesses; plastic windows fitting into said recesses; collars on said plastic windows and resting against a surface of said strip, each of said windows having one of said collars; each window having a securing rim on said collar and overlapping one of said lateral webs.

2. A cage for a large roller bearing as defined in claim 1, wherein said recesses are rectangular, at least one of said lateral webs having a uniform thickness.

3. A cage for a large roller bearing as defined in claim 1, wherein said window has a contour and is thicker toward the inside of said cage and matches a roller to be secured at half way of said contour.

4. A cage for a large roller bearing as defined in claim 1, wherein said window is symmetrical relative to predetermined planes.

5. A cage for a large roller bearing as defined in claim 1, wherein said recesses are rectangular, at least one lateral web having a uniform thickness; said securing rim having a concave surface; said window having a contour and being thicker toward the inside of said cage and matching a roller to be secured at half way said contour; said collars resting against said lateral webs and having positioning surfaces overlapping a central surface of said windows; said windows being symmetrical relative to predetermined planes.

6. A cage for a large roller bearing surrounding loosely and securing in place rollers of said bearing, comprising: a strip of metal with lateral webs and intermediate webs forming recesses; plastic windows fitting into said recesses; collars on said plastic windows and resting against a surface of said strip, each of said windows having one of said collars; each window having a securing rim on said collar and overlapping one of said lateral webs; said securing rim having a concave surface.

7. A cage for a large roller bearing surrounding loosely and securing in place rollers of said bearing, comprising: a strip of metal with lateral webs and intermediate webs forming recesses; plastic windows fitting into said recesses; collars on said plastic windows and resting against a surface of said strip, each of said windows having one of said collars; each window having a securing rim on said collar and overlapping one of said lateral webs; said collars resting against said lateral webs and having positioning surfaces overlapping a central surface of said windows.

* * * * *